US012657318B2

(12) United States Patent
Albero et al.

(10) Patent No.: US 12,657,318 B2
(45) Date of Patent: Jun. 16, 2026

(54) STEGANOGRAPHY-BASED SECURE DOCUMENT ACCESS CONTROL

(71) Applicant: Bank of America Corporation, Charlotte, NC (US)

(72) Inventors: George Anthony Albero, Charlotte, NC (US); Maharaj Mukherjee, Poughkeepsie, NY (US); Olga Kocharyan, Matthews, NC (US); Heidi Leonard Magura, Charlotte, NC (US); Michael Antonio Adams, Fort Mill, SC (US); Elijah Clark, Charlotte, NC (US); Nikhil Sanil, Tega Cay, SC (US)

(73) Assignee: Bank of America Corporation, Charlotte, NC (US)

( * ) Notice: Subject to any disclaimer, the term of this patent is extended or adjusted under 35 U.S.C. 154(b) by 196 days.

(21) Appl. No.: 18/375,582

(22) Filed: Oct. 2, 2023

(65) Prior Publication Data

US 2025/0111067 A1 Apr. 3, 2025

(51) Int. Cl.
*G06F 21/62* (2013.01)
*G06F 21/60* (2013.01)
*H04L 9/40* (2022.01)

(52) U.S. Cl.
CPC ........ *G06F 21/6209* (2013.01); *G06F 21/602* (2013.01); *H04L 63/20* (2013.01)

(58) Field of Classification Search
CPC ..... G06F 21/6209; G06F 21/602; G06F 63/20
USPC ....................................................... 713/189
See application file for complete search history.

(56) References Cited

U.S. PATENT DOCUMENTS

| | | | |
|---|---|---|---|
| 7,369,678 B2 | 5/2008 | Rhoads | |
| 7,499,566 B2 | 3/2009 | Rhoads | |
| 8,126,201 B2 | 2/2012 | Davidson et al. | |
| 8,194,915 B2 | 6/2012 | Sharma et al. | |
| 8,677,132 B1 * | 3/2014 | Liao ........................ | H04L 9/321 |
| | | | 713/176 |
| 9,185,260 B2 | 11/2015 | Reed et al. | |
| 10,607,311 B2 | 3/2020 | Alattar et al. | |
| 2005/0027980 A1 * | 2/2005 | Peled ...................... | G06F 21/10 |
| | | | 713/164 |
| 2005/0168766 A1 * | 8/2005 | Troyansky ............ | G06F 21/608 |
| | | | 358/1.14 |
| 2007/0076916 A1 | 4/2007 | Rhoads et al. | |

(Continued)

*Primary Examiner* — Anthony D Brown
(74) *Attorney, Agent, or Firm* — Banner & Witcoff, Ltd.

(57) ABSTRACT

Arrangements for steganography-based security document access control are provided. In some examples, a security policy for a document may be generated. The security policy may include identification of one or more users authorized to access the document and one or more response actions to execute upon violation of the security policy. The generated security policy may be embedded in the document using steganography. Accordingly, transmission of the document may include transmission of the security policy with the document. The document may be transmitted to a destination node. A user at the destination node may request access to the document. In response to the request, the security policy embedded in the document may be executed to confirm whether the user is an authorized user. If the user is authorized, access to the document may be enabled. If the user is not authorized, the one or more response actions may be executed.

20 Claims, 11 Drawing Sheets

(56)        References Cited

U.S. PATENT DOCUMENTS

| 2011/0019816 A1* | 1/2011 | Inami | G06T 1/00 |
| | | | 380/28 |
| 2013/0125196 A1* | 5/2013 | Shapiro | G06F 21/602 |
| | | | 726/1 |
| 2015/0271178 A1* | 9/2015 | Bhattacharya | G06F 21/6254 |
| | | | 726/1 |
| 2020/0084335 A1* | 3/2020 | Guidotti | G06F 21/1063 |

* cited by examiner

ALERT!                                                    400

A Security Policy Violation For Document

Xxxxxxx

Was Detected At Node

Yyyyyyy

Response Actions Executed:

Delete File

Cancel                                              OK

STEGANOGRAPHY-BASED SECURE DOCUMENT ACCESS CONTROL

BACKGROUND

Aspects of the disclosure relate to electrical computers, systems, and devices providing steganography-based secure document access control.

Enterprise organizations are continually looking for ways to secure private or confidential information. In particular, it may be difficult to ensure that documents including sensitive, confidential or private information are not sent to users who are not authorized to view the information. Accordingly, aspects described herein use steganography-based document security policies to ensure secure document access control.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical issues associated with controlling access to secure information and documents.

In some examples, a security policy for a document may be generated. The security policy may include identification of one or more users, groups, or the like, who are authorized to access the document. The security policy may also include one or more response actions to execute upon detection of a violation of the security policy.

In some arrangements, the generated security policy may be embedded in the document using steganography. Accordingly, transmission of the document may include transmission of the security policy with the document.

In some examples, the document may be transmitted to a destination node. A user at the destination node may request access to the document. In response to the request to access the document, the security policy embedded in the document may be executed to confirm whether the user is an authorized user. If the user is authorized, access to the document may be enabled. If the user is not authorized, the one or more response actions may be executed.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, controlling access to sensitive information is a top priority for enterprise organizations. In may be particularly difficult to ensure that only authorized users are accessing sensitive information when documents are being transmitted between users. Accordingly, aspects described herein use steganography to embed a security policy in a document. The security policy may include identification of authorized user and one or more response actions for execution upon detection of a violation of the security policy. As a document is transmitted from a source node to a destination node, the security policy embedded in the document may be transmitted as part of the document.

Upon receiving a request to access the document, the security policy embedded in the document may be executed to determine whether the requesting user is an authorized user. If so, access to the document may be enabled. If the user is not an authorized user, one or more response actions in the security policy may be executed to delete the document at the destination node, delete content of the document, obscure content of the document, or the like.

These and various other arrangements will be discussed more fully below.

Figure 1A:
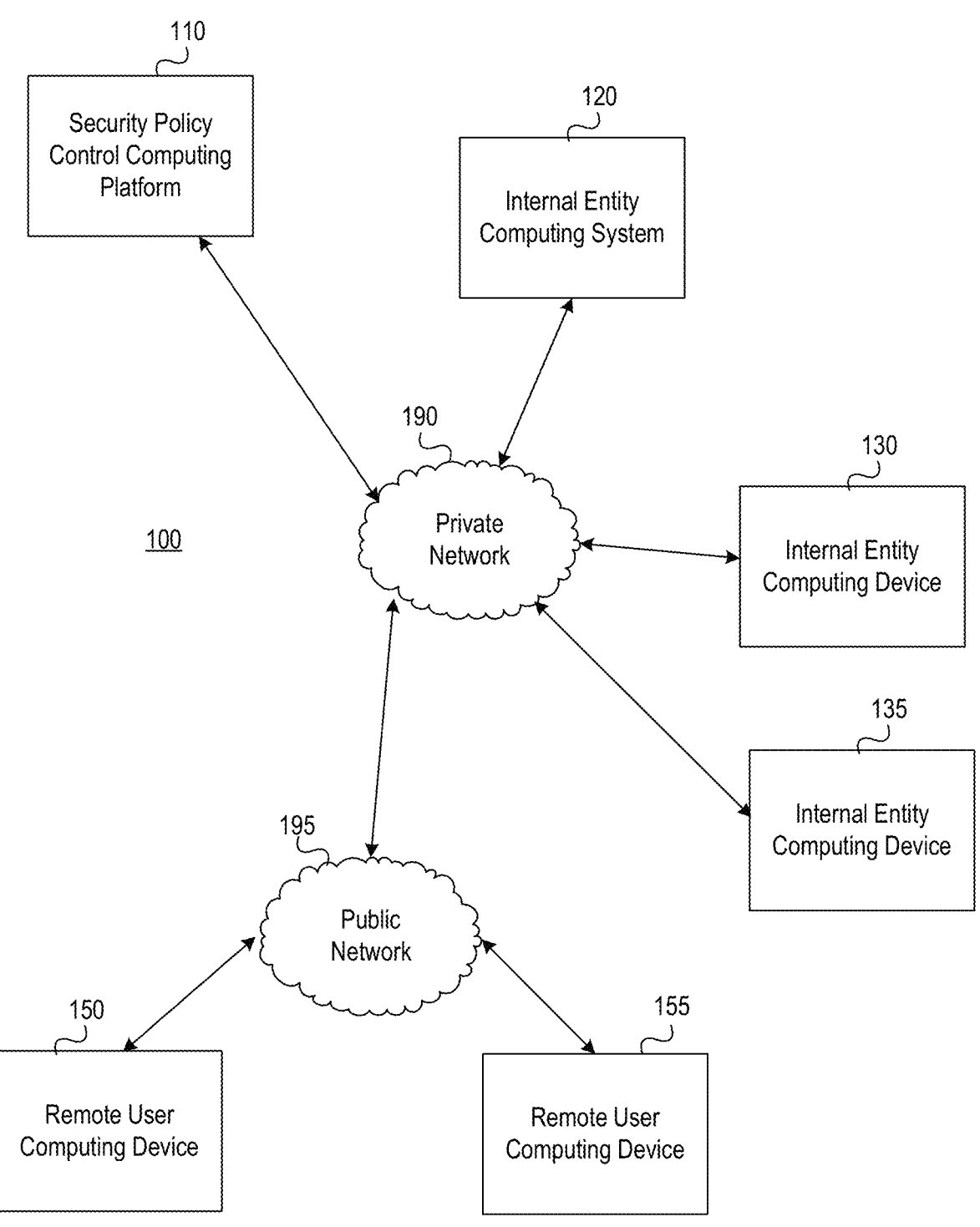
FIGS. 1A-1B depict an illustrative computing environment for implementing steganography-based secure document access control in accordance with one or more aspects described herein.
Figure 1B:
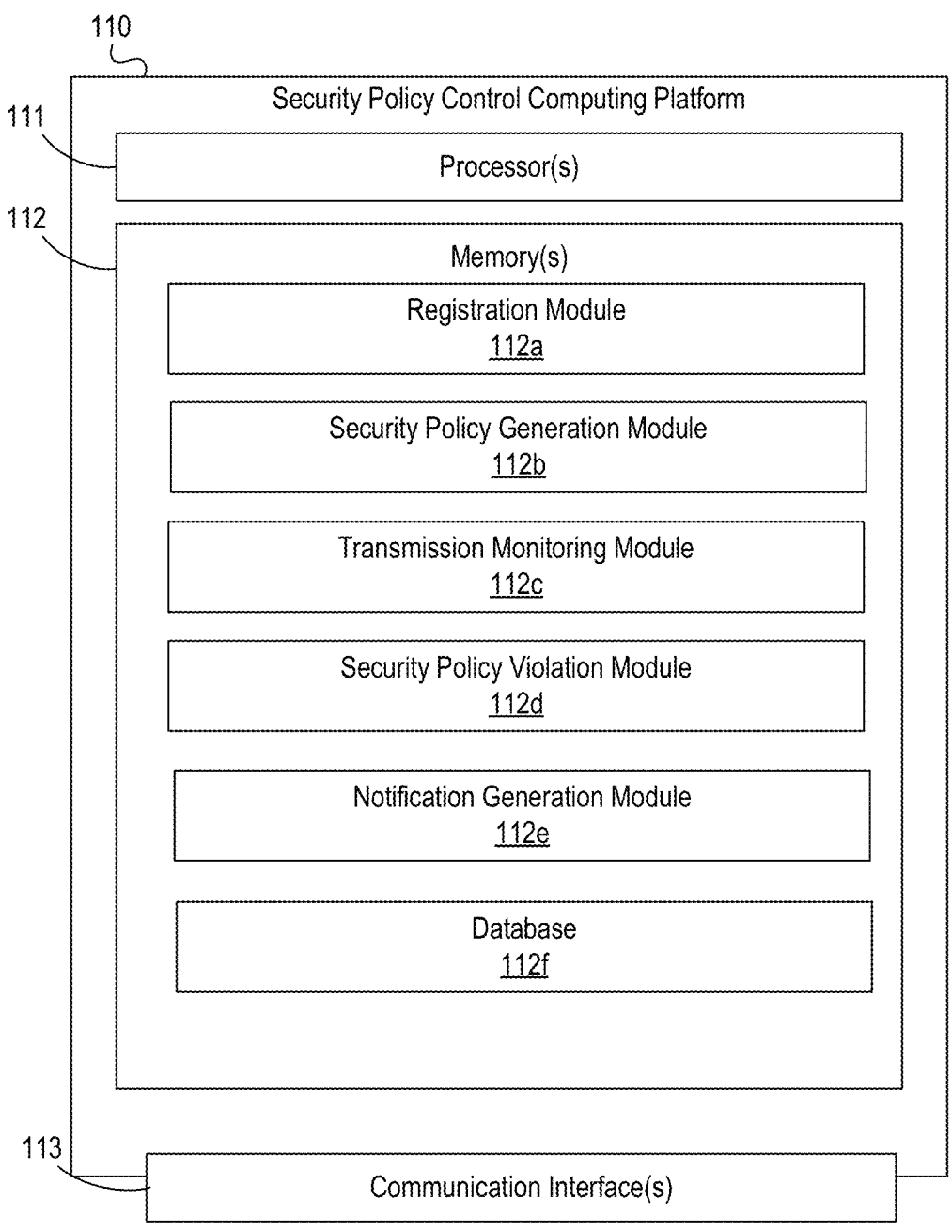

FIGS. 1A-1B depict an illustrative computing environment for implementing steganography-based secure document access control in accordance with one or more aspects described herein. Referring to FIG. 1A, computing environment 100 may include one or more computing devices and/or other computing systems. For example, computing environment 100 may include security policy control computing platform 110, internal entity computing system 120, internal entity computing device 130, internal entity computing device 135, remote user computing device 150 and remote user computing device 155. Although one internal entity computing system 120, two internal entity computing devices 130, 135 and two remote user computing devices 150, 155 are shown, more or fewer devices or systems may be used without departing from the invention. Further, while security policy control computing platform 110 is shown as a separate device, in some examples, security policy control computing platform may be part of a same device as one or more other internal entity devices or systems.

Security policy control computing platform 110 may be or include one or more computing devices (e.g., servers, server blades, or the like) and/or one or more computing components (e.g., memory, processor, and the like) and may be configured to provide dynamic, efficient steganography-based secure document access control. For instance, security policy control computing platform 110 may receive a document (e.g., a newly created document, a document retrieved from storage, or the like) as well as a request to generate a security policy for the document. In some examples, the request to generate the security policy may include one or more authorized recipients of the document (e.g., individuals or groups who are authorized to access the document), one or more response actions should the security policy be violated (e.g., delete the document, destroy contents of the document, encrypt the document to render it indecipherable, or the like) and the like. The security policy control computing platform 110 may embed the generated security policy into the document using steganography. Accordingly, the security policy may be transmitted with a document.

In some examples, generating the security policy may include segmenting the document into a plurality of content fragments. In some arrangements, each content fragment may be encrypted and containerized. Accordingly, any requests to transmit the document may cause transmission of the plurality of containers including a respective content fragment.

In some examples, security policy control computing platform 110 may receive a request to transmit or send the document. For instance, a first user operating a source node may request transmission of the document and associated security policy to a second user operating a destination node. Security policy control computing platform 110 may then transmit the document and security policy (e.g., as a whole document or as a plurality of containers including the plurality of content fragments) to the destination node.

In response to receiving an indication that a request to access the document at the destination node has been received, the security policy embedded in the document may be executed. In some examples, executing the security policy may include determining whether the destination node is associated with an authorized user. If so, access to the document may be enabled. In some examples, enabling access to the document may include retrieving the content fragments from the plurality of containers, decrypting each content fragment and recombining the decrypted fragments to generate an accessible document.

If the security policy is violated (e.g., if the user is not an authorized user) one or more response actions may be automatically executed. For instance, the document may be deleted from the destination node, the contents of the document may be deleted or obscured, the document may be encrypted to render it indecipherable to a user, or the like.

In some examples, if a security policy violation is detected, the security policy control computing platform 110 may generate one or more notifications indicating a violation has occurred and may transmit or send the notification to one or more computing devices for display.

Internal entity computing system 120 may be or include one or more computing devices (e.g., servers, server blades, or the like) and/or one or more computing components (e.g., memory, processor, and the like) and may be configured to host or execute one or more applications used by an enterprise organization, store documents used in the course of business by the employees of the enterprise organization, or the like.

Internal entity computing device 130 and/or internal entity computing device 135 may be or include computing devices such as desktop computers, laptop computers, tablets, smartphones, wearable devices, and the like, that may be associated with an enterprise organization user (e.g., an employee of the enterprise organization). Internal entity computing device 130 and/or internal entity computing device 135 may be used to generate one or more documents, request or initiate generation of the security policy, transmit or send documents as a source node, receive documents as a destination node, or the like.

Remote user computing device 150 and/or remote user computing device 155 may be or include computing devices such as desktop computers, laptop computers, tablets, smartphones, wearable devices, and the like, that may be associated with a user or customer (e.g., a customer of the enterprise organization, a vendor of the enterprise organization, other user outside the enterprise organization). In some examples, remote user computing device 150 and/or remote user computing device 155 may be a personal computing device of a user who is an employee of the enterprise organization (e.g., an employee's smart phone or personal laptop). Remote user computing device 150 and/or remote user computing device 155 may, in some examples, receive documents as a destination node, transmit or send documents as a source node, generate documents, or the like.

As mentioned above, computing environment 100 also may include one or more networks, which may interconnect one or more of security policy control computing platform 110, internal entity computing system 120, internal entity computing device 130, internal entity computing device 135, remote user computing device 150 and/or remote user computing device 155. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, security policy control computing platform 110, internal entity computing system 120, internal entity computing device 130, and/or internal entity computing device 135, may be associated with an enterprise organization (e.g., a financial institution), and private network 190 may be associated with and/or operated by the organization, and may include one or more networks (e.g., LANs, WANs, virtual private networks (VPNs), or the like) that interconnect security policy control computing platform 110, internal entity computing system 120, internal entity computing device 130, and/or internal entity computing device 135, and one or more other computing devices and/or computer systems that are used by, operated by, and/or otherwise associated with the organization. Public network 195 may connect private network 190 and/or one or more computing devices connected thereto (e.g., security policy control computing platform 110, internal entity computing system 120, internal entity computing device 130, internal entity computing device 135) with one or more networks and/or computing devices that are not associated with the organization. For example, remote user computing device 150 and/or remote user computing device 155 might not be associated with an organization that operates private network 190 (e.g., because remote user computing device 150 and/or remote user computing device 155 may be owned, operated, and/or serviced by one or more entities different from the organization that operates private network 190, one or more customers of the organization, one or more employees of the organization, public or government entities, and/or vendors of the organization, rather than being owned and/or operated by the organization itself), and public network 195 may include one or more networks (e.g., the internet) that connect remote users computing device 150 and/or remote user computing device 155 to private network 190 and/or one or more computing devices connected thereto (e.g., security policy control computing platform 110, internal entity computing system 120, internal entity computing device 130, internal entity computing device 135).

Referring to FIG. 1B, security policy control computing platform 110 may include one or more processors 111, memory 112, and communication interface 113. A data bus may interconnect processor(s) 111, memory 112, and communication interface 113. Communication interface 113 may be a network interface configured to support communication between security policy control computing platform 110 and one or more networks (e.g., network 190, network 195, or the like). Memory 112 may include one or more program modules having instructions that when executed by processor(s) 111 cause security policy control computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of security policy control computing platform 110 and/or by different computing devices that may form and/or otherwise make up security policy control computing platform 110.

For example, memory 112 may have, store and/or include registration module 112a. Registration module 112a may store instructions and/or data that may cause or enable the security policy control computing platform 110 to receive, from one or more users, devices, groups, lines of business, or the like, a request to register with the security policy control computing platform 110. For instance, users may register to access the steganography-based secure document access control systems described herein. In some examples, registration may include identification of a role within the enterprise organization, a business group, an area of work, or the like. Further, in some examples, one or more rules for security policies generated for documents within various groups may be determined. For instance, a head of a particular group may establish limits on authorized users for documents created within the scope of work done by that particular group. In another examples, a supervisor may determine at least a minimum number of content fragments to be generated for documents sent outside the group. Various other rules may be established without departing from the invention.

Security policy control computing platform 110 may further have, store and/or include security policy generation module 112b. Security policy generation module 112b may receive a document (e.g., a newly created document, a document retrieved from storage, or the like) and may generate a security policy for the document. The security policy may include identification of one or more users authorized to view or access the document, as well as one or more response actions to execute if the security policy is violated (e.g., an unauthorized user attempts to access the document). In some examples, the security policy may be based on predefined rules (e.g., rules defined for a particular business group of the like and provided, for instance, during registration). Additionally or alternatively, the security policy may be based on information provided by a user requesting generation of the security policy (e.g., the user may identify authorized users, response actions, or the like).

Security policy generation module 112b may embed the security policy in the document using, for instance, steganography. For example, various steganography techniques (e.g., secure cover selection, least significant bit, palette-based techniques, or the like) may be used to embed the generated security policy in the document. In some examples, the document and/or security policy may be encrypted.

In some arrangements, the security policy generation module 112b may segment the document into a plurality of content fragments. Each content fragment may be encrypted and containerized (e.g., associated with a distinct content container) for transmission (e.g., in multiple parts). Accordingly, a recipient user may only access the document if all containers including all content fragments are received and the security policy is not violated. In some examples, the security policy may be embedded into each content fragment of the plurality of content fragments.

Security policy control computing platform 110 may further have, store and/or include transmission monitoring module 112c. Transmission monitoring module 112c may store instructions and/or data that may cause or enable the security policy control computing platform 110 to transmit documents from a source node to a destination node, monitor transmission or a network path or location of documents, receive an indication of a request to access a document, initiate execution of a security policy or monitor an output of a security policy execution by a document, receive an indication of security policy violations and/or response actions, or the like. In some examples, the embedded steganography-based security policy may include beaconing arrangements that may communicate with the security policy control computing platform 110 to provide an indication of location, transmission path, destination node, and the like.

Security policy control computing platform 110 may further have, store and/or include security policy violation module 112d. Security policy violation module 112d may store instructions and/or data that may cause or enable the security policy control computing platform 110 to receive an indication of a violation of a security policy, cause execution of one or more response actions, receive an indication of automatic execution of one or more response actions by the document, or the like. In some examples, the security policy violation module 112d may receive an indication from transmission monitoring module 112c of a location of a document and security policy violation module 112d may initiate execution of a response action (e.g., cause deletion of the document at a current node, delete or obscure content of the document or the like).

Security policy control computing platform 110 may further have, store and/or include notification generation module 112e. Notification generation module 112e may store instructions and/or data that may cause or enable the security policy control computing platform 110 to generate one or more notifications in response to detection of a violation of a security policy, transmit notifications to one or more devices or systems for display, or the like.

Security policy control computing platform 110 may further have, store and/or include a database 112f. Database 112f may store data associated with user registration, security policy violations, executed response actions, and/or other data that enables performance of the aspects described herein by the security policy control computing platform 110.

FIGS. 2A-2F depict one example illustrative event sequence for implementing steganography-based secure document access control in accordance with one or more aspects described herein. The events shown in the illustrative event sequence are merely one example sequence and additional events may be added, or events may be omitted, without departing from the invention. Further, one or more processes discussed with respect to FIGS. 2A-2F may be performed in real-time or near real-time.

Figure 2A:
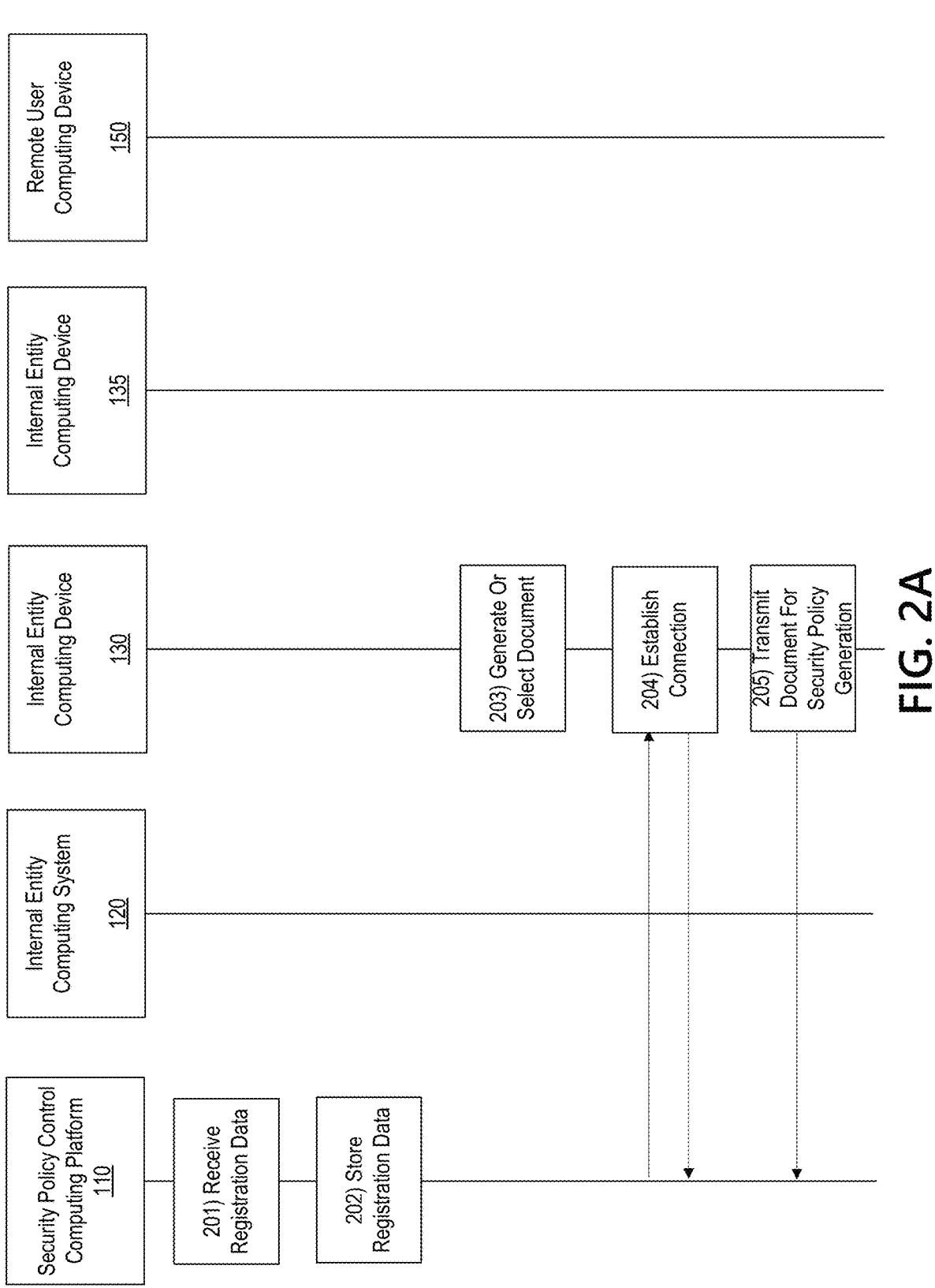
FIGS. 2A-2F depict an illustrative event sequence for implementing c steganography-based secure document access control in accordance with one or more aspects described herein.

With reference to FIG. 2A, at step 201, security policy control computing platform 110 may receive registration data. For instance, data from one or more users, groups, or the like including a request to register for steganography based secure document access control may be received. In some examples, the data received may include authorized users to who may access documents associated with a particular group, particular response actions to execute if a security policy is violated, a minimum number of content fragments to segregate a document into prior to transmission, and the like.

At step 202, the registration data (and, for instance, user or group preference or customization data) may be stored by the security policy control computing platform 110. For instance, a database may be modified to include one or more database entries corresponding to the registration data received.

At step 203, internal entity computing device 130 may generate a document. The document may be any type of document (e.g., text document, image file, audio file, or the like) and may include any file type (e.g., PDF, DOCX, or the like). In some examples, the document may be generated by an employee of the enterprise organization (e.g., during the course of business). While FIG. 2A shows the document being generated by internal entity computing device 130, in other examples, the document may be generated by (or retrieved from) other computing devices, such as internal entity computing device 135, remote user computing device 150, or the like, without departing from the invention. Further, while step 203 describes a document being generated, in some examples, an existing document may be retrieved rather than a new document being generated.

At step 204, internal entity computing device 130 may establish a connection with the security policy control computing platform 110. For instance, a first wireless connection may be established between the internal entity computing device 130 and the security policy control computing platform 110. Upon establishing the first wireless connection, a communication session may be initiated between the internal entity computing device 130 and the security policy control computing platform 110.

At step 205, internal entity computing device 130 may transmit the document to the security policy control computing platform 110 for security policy generation. For instance, the internal entity computing device 130 may transmit or send the document to the security policy control computing platform 110 during the communication session initiated upon establishing the first wireless connection.

Figure 2B:
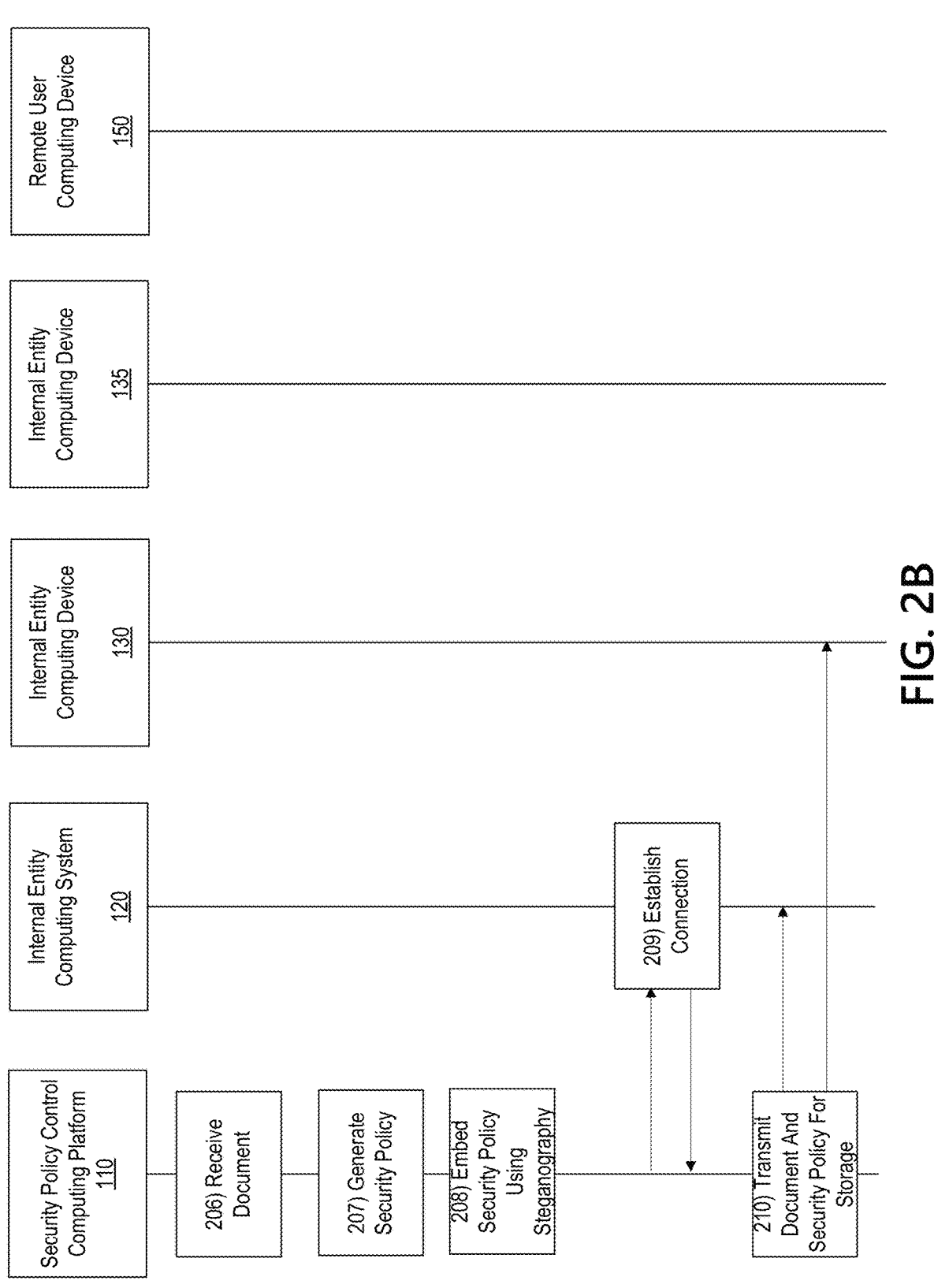

With reference to FIG. 2B, at step 206, security policy control computing platform 110 may receive the document transmitted by the internal entity computing device 130.

At step 207, security policy control computing platform 110 may generate a security policy for the document. For instance, based on user preferences provided during registration (e.g., authorized users, identified response actions, or the like) and/or information provided by a user with the transmission of the document for security policy generation (e.g., sending the document may include user information identifying authorized users, one or more response actions, or the like), security policy control computing platform 110 may generate a security policy for the document. In some examples, the security policy may include one or more authorized users, groups, lines of business, or the like, that are authorized to access the document. In some arrangements, the security policy may include one or more response actions to execute if the security policy is violated (e.g., if an unauthorized user requests access to the document). For instance, if the security policy is violated, the document may be deleted, content of the document may be deleted or obscured, the document may be encrypted, or the like.

At step 208, security policy control computing platform 110 may embed the security policy in the document using steganography. For instance, security policy control computing platform 110 may use steganography to embed the generated security policy in the document. Accordingly, transmission of the document (e.g., from a source node to a destination node) may include transmitting the security policy with the document. The security policy may then be executed at any computing device (e.g., any node) to confirm that a user requesting access to the document is an authorized user according to the security policy and, if not, execute the one or more response actions identified in the security policy. In some examples, the security policy may be transmitted with the document within a network or firewall associated with an enterprise organization or outside the network or firewall associated with the enterprise organization. Accordingly, the security policy may be executed to verify that only authorized users are accessing a document, even if the document has been sent outside the enterprise organization.

In some examples, the embedded security policy may include one or more beaconing arrangements. For instance, a steganographic beacon may be embedded in the document to enable monitoring of a location of the document, whether the document is inside an enterprise organization firewall, a transmission route of the document, and the like. Accordingly, one or more arrangements may include location tracking associated with the document to further reduce or prevent unauthorized access to the document or the contents of the document.

In some examples, the security policy embedded using steganography may include microcode configured to identify a location of the document, when the document was sent, as well as aspects of the security policy (e.g., authorized users, response actions, or the like).

At step 209, internal entity computing system 120 may establish a connection with the security policy control computing platform 110. For instance, a second wireless connection may be established between the internal entity computing system 120 and the security policy control computing platform 110. Upon establishing the second wireless connection, a communication session may be initiated between the internal entity computing system 120 and the security policy control computing platform 110.

At step 210, security policy control computing platform 110 may transmit or send the document, along with the embedded security policy, for storage at one or more of the internal entity computing system 120 (e.g., a document storage system of the enterprise organization) and/or the internal entity computing device 130 (e.g., the computing device that generated the document or transmitted the document for generation of the security policy).

In some examples, transmitting the document for the generation of the security policy may include a request to transmit the document to a destination node (e.g., internal entity computing system 135, remote user computing device 150, or the like). In those arrangements, the storage step at 210 may, in some examples, be bypassed or may be performed after the document is sent to the destination node.

Figure 2C:
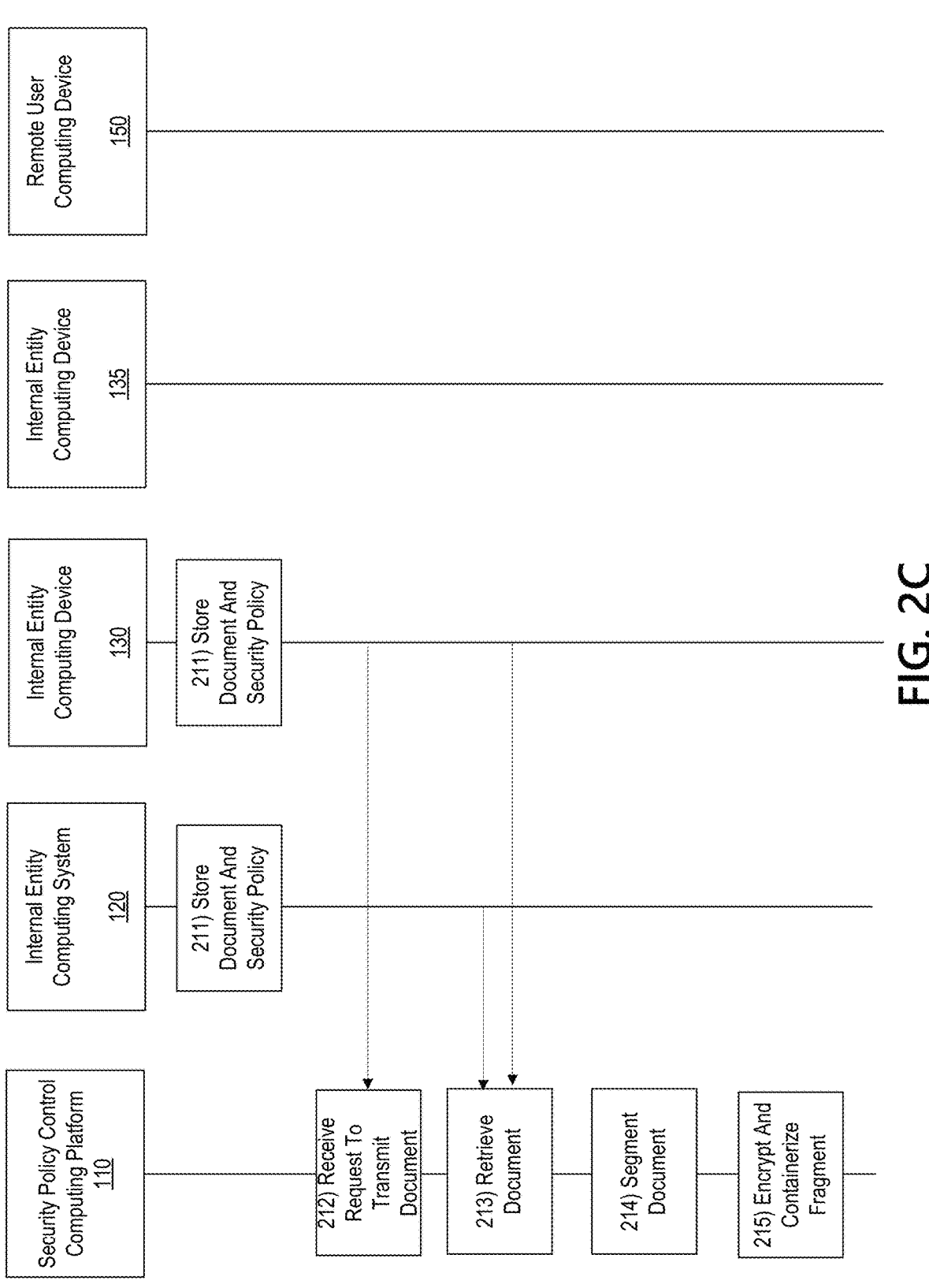

With reference to FIG. 2C, at step 211, the document and embedded security policy may be stored by one or more of the internal entity computing system 120 and/or the internal entity computing device 130.

At step 212, security policy control computing platform 110 may receive a request to transmit the document (e.g., from a source node to a destination node). In some examples, this request may be received with the document when it is sent for generation of the security policy. In the example shown in FIG. 2C, the request may be received from the internal entity computing device 130, which may, in some examples, correspond to the device at which the document was generated. The request to transmit the document may include identification of one or more destination nodes (e.g., one or more receiving computing devices).

At step 213, security policy control computing platform 110 may retrieve the document from one of the internal entity computing system 120 or the internal entity computing device 130. In some examples, the request to transmit the document received at step 212 may include the document for transmission and, in those examples, step 213 may be omitted. In some examples, retrieving the document may further include encrypting the document, and embedded security policy, prior to transmission.

In some examples, prior to transmission, the document may be segmented and sent in one or more parts to further ensure security of the document. In some examples, the request to transmit the document may include a request to segment the document. In other examples, a predefined rule (e.g., received during registration) may include an instruction to segment documents being transmitted for a particular user, group, or the like. Accordingly, if no request to segment the document prior to transmission is received, steps 214 and 215 may be omitted and the process may continue at step 216 in FIG. 2D.

If a request to segment the document is received, at step 214, the document may be segmented into a plurality of content fragments. In some examples, the number of content fragments may be determined based on user preferences defined at registration, based on user input received with the request to segment the document, or the like. In some examples, each content fragment of the plurality of content fragments may include the security policy for the document. Accordingly, if one content fragment is received by an unauthorized user who attempts to access the content fragment, the security policy may identify the violation and execute the one or more response actions for that content fragment or, in some examples, for all content fragments.

At step 215, each content fragment of the plurality of content fragments may be encrypted and associated with a container for transmission. Accordingly, a plurality of containers, each corresponding to a respective encrypted content fragment, may be transmitted to the destination node (e.g., rather than transmission of the document as a whole).

Figure 2D:
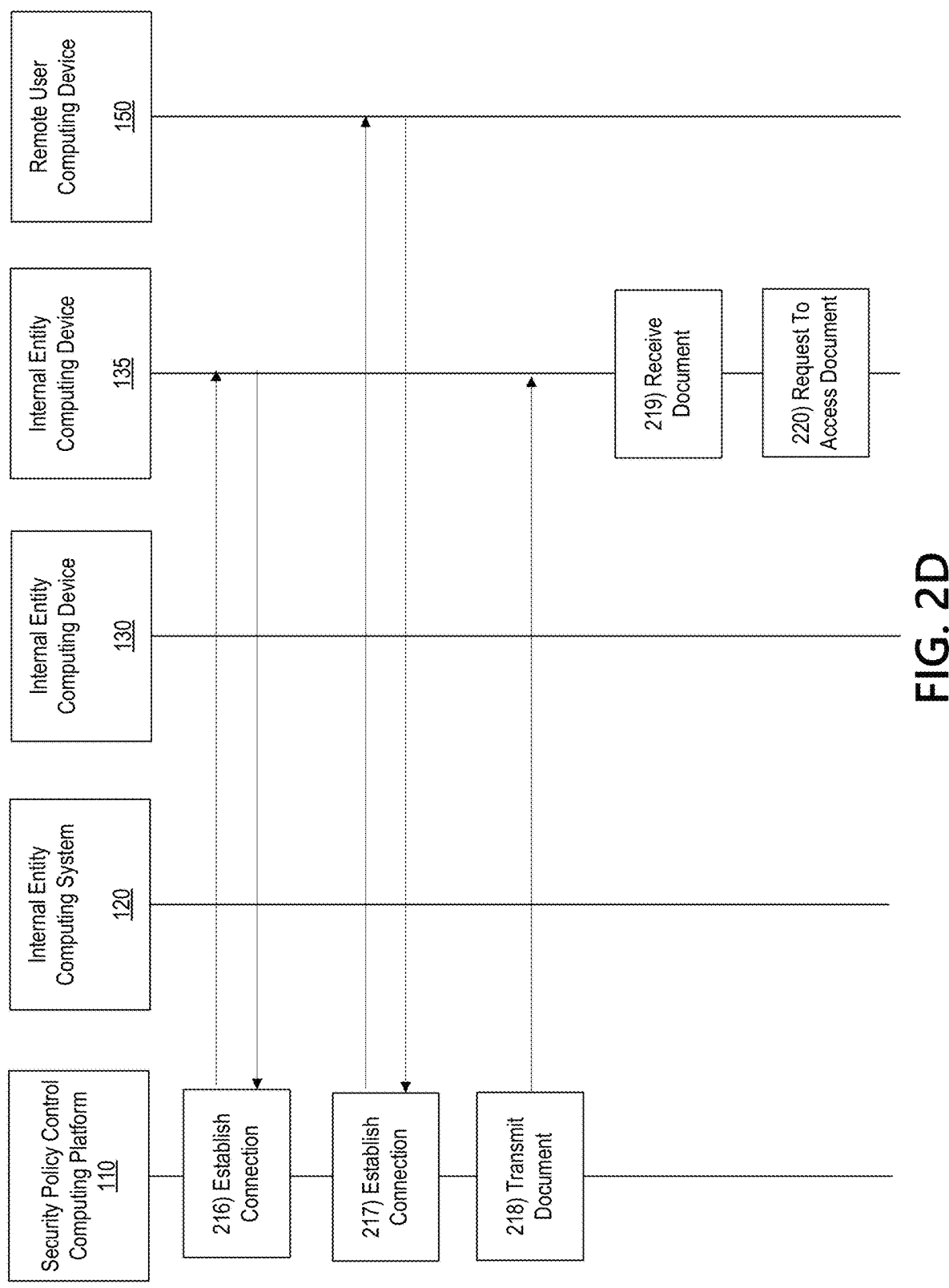

With reference to FIG. 2D, at step 216, security policy control computing platform may establish a connection with the internal entity computing device 135. For instance, a third wireless connection may be established between the security policy control computing platform 110 and the internal entity computing device 135. Upon establishing the third wireless connection, a communication session may be initiated between the security policy control computing platform 110 and the internal entity computing device 135.

At step 217, security policy control computing platform may establish a connection with the remote user computing device 150. For instance, a fourth wireless connection may be established between the security policy control computing platform 110 and remote user computing device 150. Upon establishing the fourth wireless connection, a communication session may be initiated between the security policy control computing platform 110 and the remote user computing device 150.

At step 218, security policy control computing platform 110 may transmit or send the document (or the plurality of containers including the plurality of content fragments) to internal entity computing device 135 (e.g., based on internal entity computing device 135 being identified as a destination node in the request to transmit the document).

At step 219, internal entity computing device 135 may receive the document or the plurality of containers including the plurality of content fragments.

At step 220, internal entity computing device 135 may receive a request to access the document. For instance, a user of internal entity computing device 135 may request to open or otherwise access the document received from the source node.

Figure 2E:
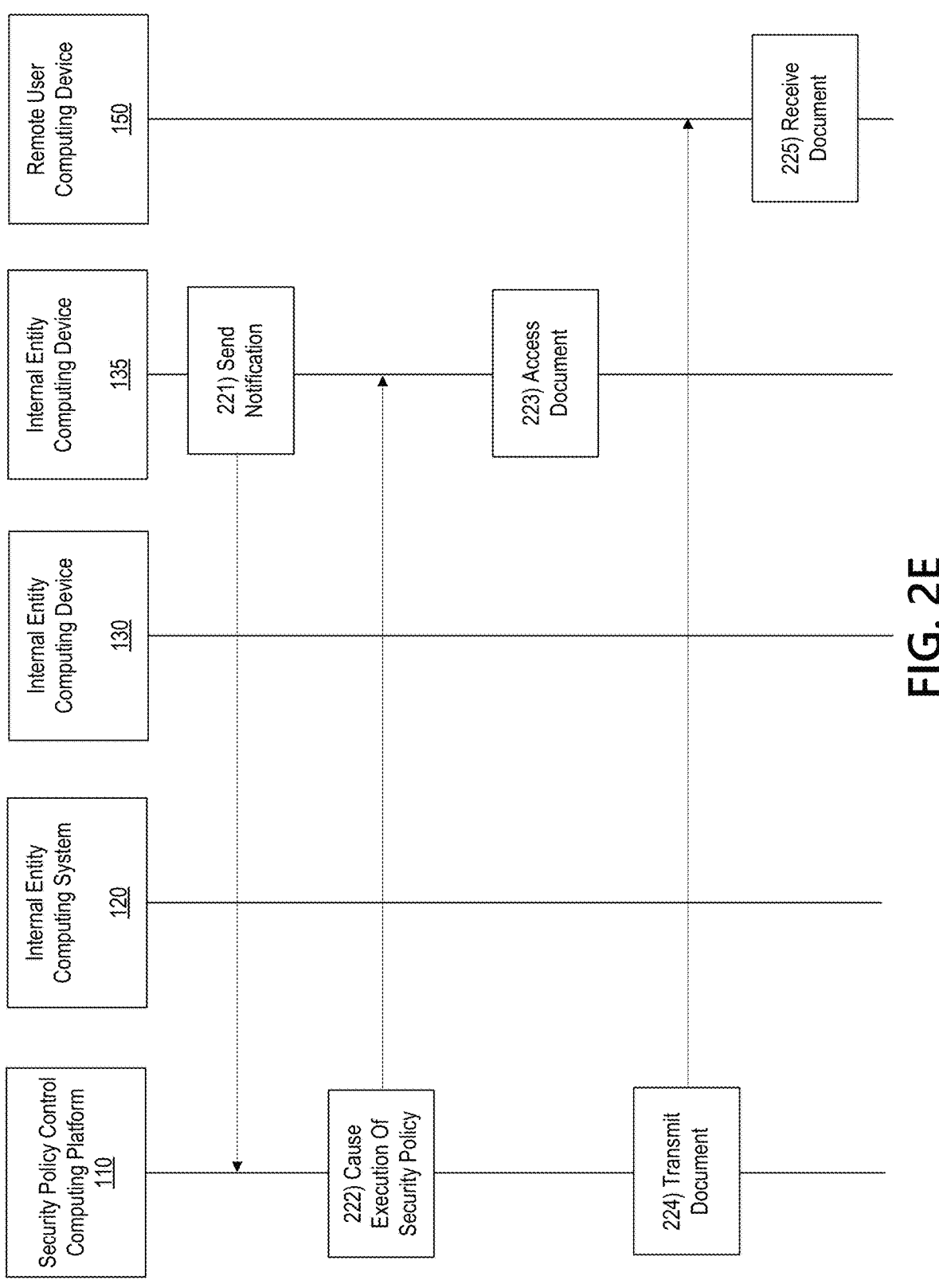

With reference to FIG. 2E, at step 221, internal entity computing device 135 may transmit or send an indication of the received request to access the document to the security policy control computing platform 110. In some examples, internal entity computing device 135 transmitting or sending the indication may be caused by the document transmitting an indication that a request to access the document has been received.

At step 222, security policy control computing platform 110 may receive the indication of the request to access the document and may execute the security policy associated with the document. In some examples, the security policy may be automatically executed upon a user requesting to access the document (e.g., a user may select to open the document which may cause the security policy to execute).

At step 223, based on execution of the security policy, the requesting user at internal entity computing device 135 may be permitted to access the document. For instance, execution of the security policy may cause verification of the destination node or user of the destination node as a user authorized to access the document. If so, the user may access the document. In some examples, if the document was transmitted via a plurality of containers including content fragments, each content fragment may be extracted from a respective container, may be decrypted and the recombined to generate the document and allow access to the document.

At step 224, security policy control computing platform 110 may transmit or send the document (or the plurality of containers including the plurality of content fragments) to the remote user computing device 150 (e.g., based on remote user computing device 150 being identified as a destination node in the request to transmit the document).

At step 225, remote user computing device 150 may receive the document or the plurality of containers including the plurality of content fragments.

Figure 2F:
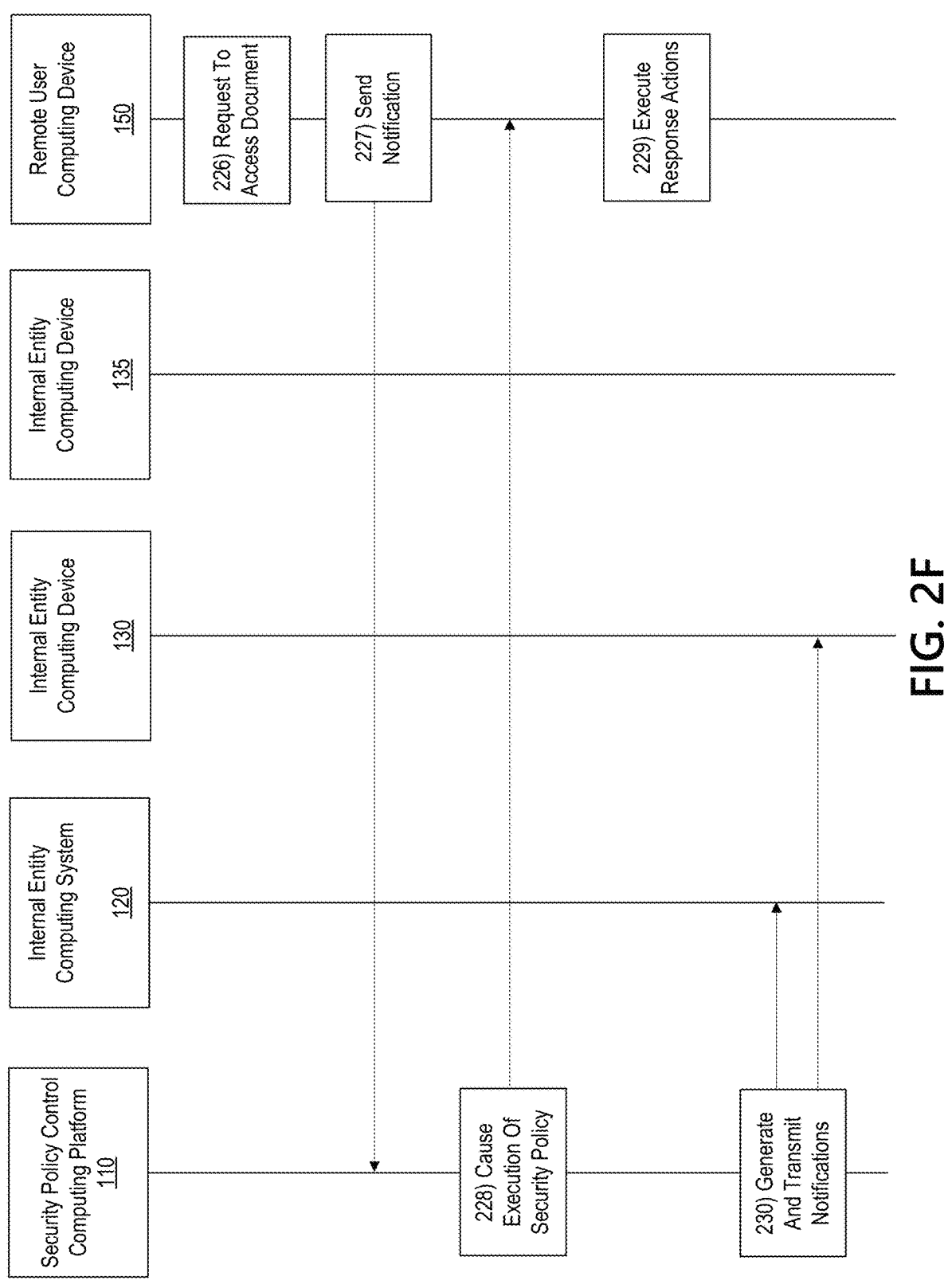

With reference to FIG. 2F, at step 226, remote user computing device 150 may receive a request to access the document. For instance, a user of remote user computing device 150 may request to open or otherwise access the document received from the source node.

At step 227, remote user computing device 150 may transmit or send an indication of the received request to access the document to the security policy control computing platform 110. In some examples, remote user computing device 150 transmitting or sending the indication may be caused by the document transmitting an indication that a request to access the document has been received.

At step 228, security policy control computing platform 110 may receive the indication of the request to access the document and may execute the security policy associated with the document. In some examples, the security policy may be automatically executed upon a user requesting to access the document (e.g., a user may select to open the document which may cause the security policy to execute).

At step 229, based on execution of the security policy, the requesting user at remote user computing device may be denied access and one or more response actions (e.g., from the security policy) may be automatically executed. For instance, execution of the security policy may cause verification of the destination node or user of the destination node as a user authorized to access the document. If the user or destination node is not authorized based on the security policy, the one or more response actions within the security policy may be executed. For instance, the document may be deleted from remote user computing device 150, content of the document may be deleted or obscured, the document may be encrypted to render it indecipherable, or the like.

In examples in which the document is sent via a plurality of containers including content fragments, if the user is not authorized to access the document, the security policy may cause a response action at one or more containers, at all containers, or the like.

Although the example shown and described include the internal entity computing device 135 accessing the document while the external device (e.g., remote user computing device 150) being unable to access the document, in some examples, the external device may be authorized to access the document while the internal device might not be authorized.

Figure 4:
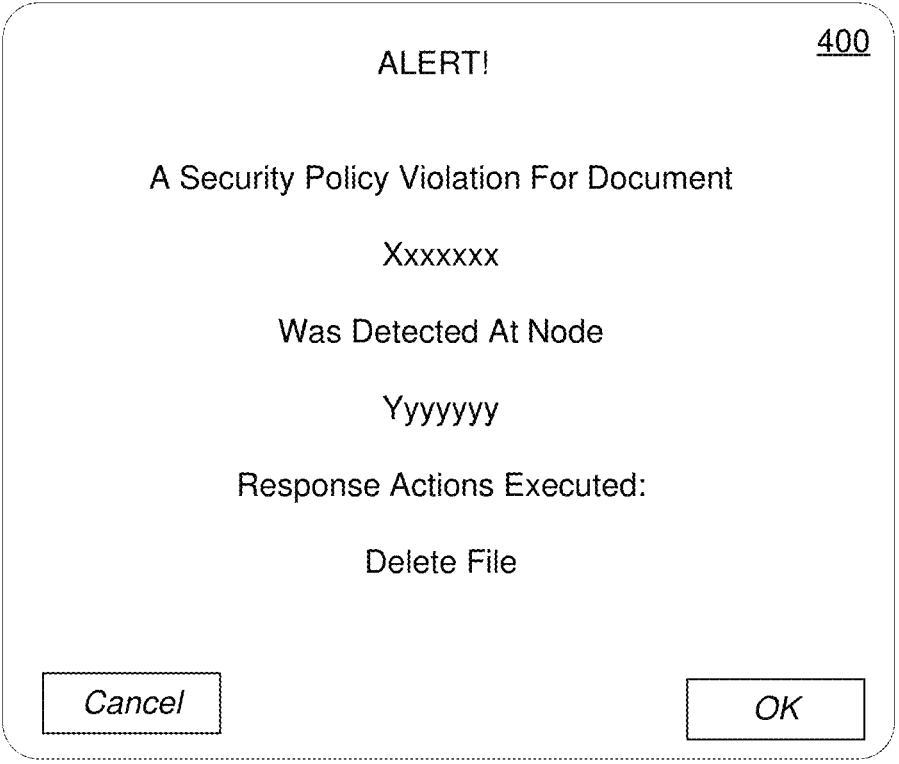
FIG. 4 illustrates an example graphical user interface that may be generated in accordance with one or more aspects described herein.

At step 230, security policy control computing platform 110 may generate one or more notifications of the violation of the security policy (e.g., of the determination that remote user computing device 150 is not authorized to access the document). The one or more notifications may include identification of the unauthorized destination node, identification of a requesting sender or source node, identification of response actions executed, and the like). FIG. 4 illustrates one example notification 400 that may be generated. The notification 400 includes identification of the document impacted, node at which the security policy was violated and response actions executed. Additional or alternative information may be provided in the notification without departing from the invention.

The one or more notifications may be transmitted to one or more devices, such as internal entity computing system 120, internal entity computing device 135, or the like. In some examples, transmitting the one or more notifications may cause the one or more notifications to be displayed by a display of the internal entity computing system 120 and/or internal entity computing device 130.

Figure 3:
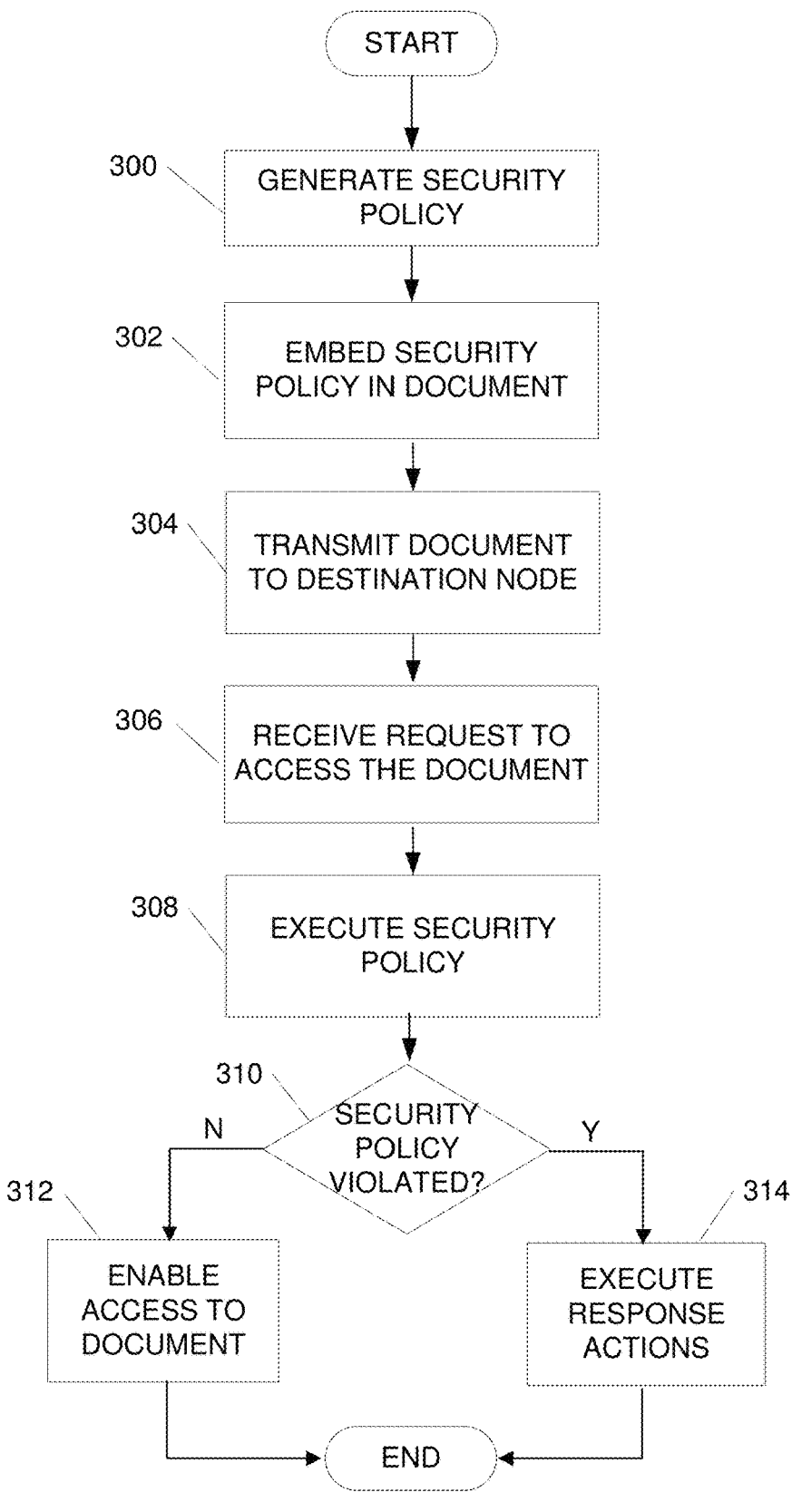
FIG. 3 depicts an illustrative method for implementing steganography-based secure document access control in accordance with one or more aspects described herein.

FIG. 3 is a flow chart illustrating one example method of steganography-based security document access control in accordance with one or more aspects described herein. The processes illustrated in FIG. 3 are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIG. 3 may be performed in real-time or near real-time.

At step 300, a computing platform may generate a security policy for a document. In some examples, the security policy may include identification of one or more authorized recipients who may access the document, one or more response actions to execute upon determination or detection of a violation of the security policy, and the like.

At step 302, the computing platform may embed the security policy in the document using steganography. For instance, the security policy, including authorized users and response actions, may be embedded in the document using steganography. Accordingly, any transmission of the document from a source to a destination may include transmitting the security policy with the document.

At step 304, the document may be transmitted to a destination node. For instance, the computing platform may receive a request to transmit the document to the destination node and may, in response, transmit the document, including the embedded security policy, to the destination node. In some examples, transmitting the document may include segmenting the document into a plurality of content fragments, encrypting each content fragment and sending the plurality of encrypted content fragments in a plurality of containers to the destination node.

At step 306, the computing platform may receive a request to access the document via the destination node. In some examples, the request to access the document may include a user selection of the document or request to open the document. The request to access the document may cause execution of the security policy embedded in the document at step 308. Accordingly, execution of the security policy may include determining whether the destination node is identified as an authorized node or a user associated with the destination node is an authorized user (e.g., based on the security policy).

At step 310, a determination may be made as to whether the security policy is violated. If not, at step 312, user access to the document may be enabled. In examples in which the document is segmented, the content fragments from each container may be extracted, decrypted and recombined to provide user access to the document.

If, at step 310, the security policy is violated, one or more response actions associated with the security policy may be executed at step 314. For instance, the document may be deleted at the destination node, contents of the document may be deleted or obscured, or the like.

As discussed herein, steganography may be used to embed an executable security policy in a document. The security policy may include identification of one or more users authorized to access the document, and one or more response actions to execution upon a detected violation of the security policy.

As discussed herein, if an attempt to access a document by an unauthorized user (e.g., a security policy violation) is detected, the one or more response actions in the security policy may be executed. For instance, the document may be destroyed, deleted, contents deleted or obscured, or the like. The arrangements described herein enable execution of the response actions regardless of the location of the document (e.g., whether within an internal enterprise organization network or firewall or outside the enterprise organization network or firewall).

In some examples, documents may be marked as test documents or confidential documents (e.g., using watermarking, steganography, or the like) to monitor transmission of the documents, identify potential unauthorized activity, and the like. This may enable security personnel to identify an unauthorized collaboration, appropriately escalate any identified issues, and the like.

In some arrangements, a document may be segmented into a plurality of content fragments and transmitted via a plurality of containers. In some examples, the containers may be transmitted via different transmission routes to further ensure document security. In some examples, if a security policy violation is detected at one container, one or more response actions may be executed on all containers to ensure no unauthorized access to the document. Further, the container at which unauthorized access was attempted may be identified and the attempted unauthorized access may be tracked and/or further investigated. Additionally or alternatively, fewer than all containers may be subject to the response actions and, in some examples, only some contents of a container may be subject to the response actions.

In some examples, documents may be routed through one or more intermediary nodes before transmission to the destination node (e.g., as part of the security policy). In some examples, users associated with the intermediary nodes may be able to have the document at the node but might not be authorized to access the document. Accordingly, the system may track the transmission route of the document, actions taken at the intermediary nodes, and the like. In some examples, if the document is not properly routed through the identified intermediary nodes, a security policy violation may be detected and the one or more response actions may be executed.

Although several aspects described herein relate to execution of the security policy upon receiving a request to access the document, in some examples, the security policy may continuously execute to quickly detect potential violations. For instance, if a security policy indicates that transmission outside a particular network is not allowed for the document, upon detection of the document exiting the network (e.g., as the document traverses various network nodes along a path, the security policy may verify that a violation has not occurred), the one or more response actions may execute (e.g., the document might not be delivered to the destination and, instead, may be destroyed prior to delivery). In some examples, beaconing between containers may be used to track locations of containers, detect security policy violations, or the like.

Aspects described herein may be used with various types of document transfer systems. For instance, documents sent as email attachments, via file transfer protocols, or the like, may include the embedded security policy described herein.

As discussed herein, the users authorized to access a document may be based on user input from a user requesting transfer of the document, may be identified according to user preferences (e.g., groups of users who are authorized), or the like. In some examples, the groups of users may be dynamically updated such that, if a user leaves a particular group, the group may be updated to no longer identify that user as authorized and the security policy would dynamically update.

Further, aspects described herein enable execution of response actions retroactively. For instance, a document may be transferred to an authorized user at company A. The following week, company A may suffer a data breach. In some examples, the security policy control computing platform 110 may update the security policy to indicate that user is no longer authorized, or otherwise case an indication of a violation of the security policy in order to execute the one or more response actions.

The aspects described herein can be used within any computing environment (e.g., cloud-based environments, or the like). Further, aspects described herein may be customized based on whether a document is being transferred within or outside the enterprise organization. For instance, a first level of encryption or a first number of content fragments may be used if within the enterprise organization, while a second level of encryption of second number (e.g., greater number) of content fragments may be generated if sending outside the enterprise organization.

Although various aspects described herein are directed to response actions including deleting the document, deleting content or obscuring content, or the like, in some examples, only portions of the document may be obscured to deleted. For instance, in some examples, sensitive information may be identified and, in response to detecting violation of a security policy, only the sensitive portions of the document may be obscured or deleted. In some examples, the response action may be based on characteristics of a user or node attempting to access the document without authorization. For instance, an internal unauthorized access may cause execution of a first response action while an external unauthorized access may cause execution of a second, different response action. In another example, a user may be authorized to access a document on a device associated with the enterprise organization but not a personal device. Accordingly, if the user attempts to access the document via their personal device, the response actions may execute.

Figure 5:
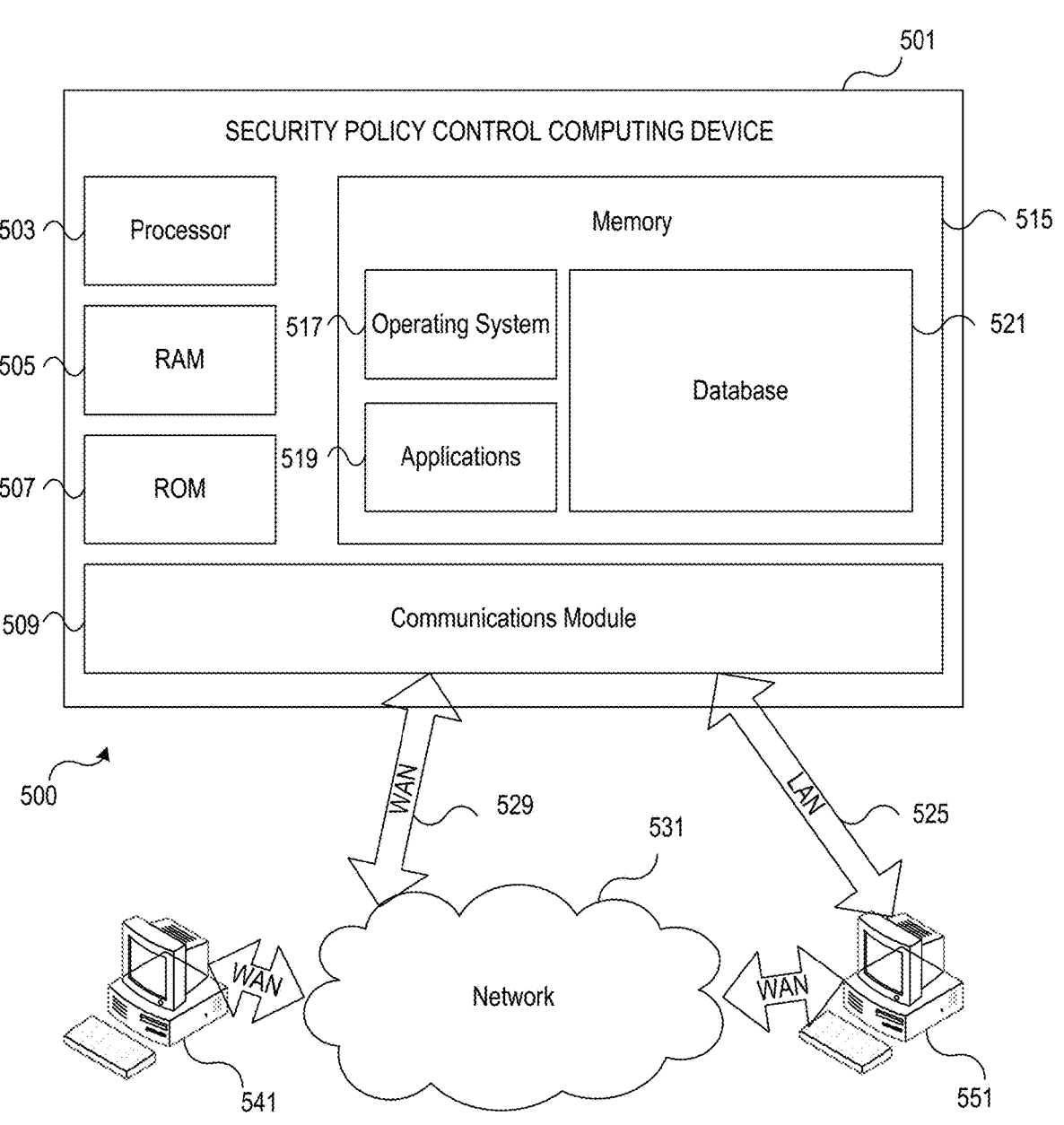
FIG. 5 illustrates one example environment in which various aspects of the disclosure may be implemented in accordance with one or more aspects described herein.

FIG. 5 depicts an illustrative operating environment in which various aspects of the present disclosure may be implemented in accordance with one or more example embodiments. Referring to FIG. 5, computing system environment 500 may be used according to one or more illustrative embodiments. Computing system environment 500 is only one example of a suitable computing environment and is not intended to suggest any limitation as to the scope of use or functionality contained in the disclosure. Computing system environment 500 should not be interpreted as having any dependency or requirement relating to any one or combination of components shown in illustrative computing system environment 500.

Computing system environment 500 may include security policy control computing device 501 having processor 503 for controlling overall operation of security policy control computing device 501 and its associated components, including Random Access Memory (RAM) 505, Read-Only Memory (ROM) 507, communications module 509, and memory 515. Security policy control computing device 501 may include a variety of computer readable media. Computer readable media may be any available media that may be accessed by security policy control computing device 501, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by security policy control computing device 501.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on security policy control computing device 501. Such a processor may execute computer-executable instructions stored on a computer-readable medium.

Software may be stored within memory 515 and/or storage to provide instructions to processor 503 for enabling security policy control computing device 501 to perform various functions as discussed herein. For example, memory 515 may store software used by security policy control computing device 501, such as operating system 517, application programs 519, and associated database 521. Also, some or all of the computer executable instructions for security policy control computing device 501 may be embodied in hardware or firmware. Although not shown, RAM 505 may include one or more applications representing the application data stored in RAM 505 while security policy control computing device 501 is on and corresponding software applications (e.g., software tasks) are running on security policy control computing device 501.

Communications module 509 may include a microphone, keypad, touch screen, and/or stylus through which a user of security policy control computing device 501 may provide input, and may also include one or more of a speaker for providing audio output and a video display device for providing textual, audiovisual and/or graphical output. Computing system environment 500 may also include optical scanners (not shown).

Security policy control computing device 501 may operate in a networked environment supporting connections to one or more other computing devices, such as computing device 541 and 551. Computing devices 541 and 551 may be personal computing devices or servers that include any or all of the elements described above relative to security policy control computing device 501.

The network connections depicted in FIG. 5 may include Local Area Network (LAN) 525 and Wide Area Network (WAN) 529, as well as other networks. When used in a LAN networking environment, security policy control computing device 501 may be connected to LAN 525 through a network interface or adapter in communications module 509. When used in a WAN networking environment, security policy control computing device 501 may include a modem in communications module 509 or other means for establishing communications over WAN 529, such as network 531 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one FIG. may be used in combination with one or more steps described with respect to another figure, and/or one or more depicted steps may be optional in accordance with aspects of the disclosure.

What is claimed is:

1. A computing platform, comprising:
at least one processor;
a communication interface communicatively coupled to the at least one processor; and
a memory storing computer-readable instructions that, when executed by the at least one processor, cause the computing platform to:
generate, for a document, a security policy, wherein the security policy includes authorized recipients of the document and one or more response actions to execute upon determination of violation of the security policy;
embed, using steganography, the security policy in the document;
transmit the document, including the security policy embedded using steganography, from a source node to a destination node;
receive, from the destination node, a request to access the document;
responsive to receiving the request to access the document, execute the embedded security policy in the document to determine whether the security policy is violated;
responsive to determining that the security policy is not violated, enable access to the document by the destination node; and
responsive to determining that the security policy is violated, execute the one or more response actions.

2. The computing platform of claim 1, wherein determining whether the security policy is violated includes determining whether the destination node is associated with an authorized recipient of the authorized recipients in the security policy.

3. The computing platform of claim 1, wherein the one or more response actions include one or more of: deleting the document and destroying contents of the document at the destination node.

4. The computing platform of claim 1, further including instructions that, when executed, cause the computing platform to:
segment the document into a plurality of content fragments; and
encrypt each content fragment of the plurality of content fragments, and
wherein transmitting the document from the source node to the destination node includes transmitting each encrypted content fragment in distinct content container.

5. The computing platform of claim 4, wherein enabling access to the document by the destination node includes decrypting each content fragment from each distinct content container and recombining plurality of content fragments to display the document.

6. The computing platform of claim 4, wherein each content fragment includes the security policy generated for the document.

7. The computing platform of claim 1, wherein the authorized recipients are identified in a request to generate the security policy for the document.

8. A method, comprising:
generating, by a computing platform, the computing platform having at least one processor and memory, and for a document, a security policy, wherein the security policy includes authorized recipients of the document and one or more response actions to execute upon determination of violation of the security policy;
embedding, by the at least one processor and using steganography, the security policy in the document;
transmitting, by the at least one processor, the document, including the security policy embedded using steganography, from a source node to a destination node;
receiving, by the at least one processor and from the destination node, a request to access the document;
based on receiving the request to access the document, executing, by the at least one processor, the embedded security policy in the document to determine whether the security policy is violated;
when it is determined that the security policy is not violated, enabling, by the at least one processor, access to the document by the destination node; and
when it is determined that the security policy is violated, executing, by the at least one processor, the one or more response actions.

9. The method of claim 8, wherein determining whether the security policy is violated includes determining whether the destination node is associated with an authorized recipient of the authorized recipients in the security policy.

10. The method of claim 8, wherein the one or more response actions include one or more of: deleting the document and destroying contents of the document at the destination node.

11. The method of claim 8, further including:
segmenting, by the at least one processor, the document into a plurality of content fragments; and
encrypting, by the at least one processor, each content fragment of the plurality of content fragments, and
wherein transmitting the document from the source node to the destination node includes transmitting each encrypted content fragment in distinct content container.

12. The method of claim 11, wherein enabling access to the document by the destination node includes decrypting each content fragment from each distinct content container and recombining plurality of content fragments to display the document.

13. The method of claim 11, wherein each content fragment includes the security policy generated for the document.

14. The method of claim 8, wherein the authorized recipients are identified during a registration process.

15. One or more non-transitory computer-readable media storing instructions that, when executed by a computing platform comprising at least one processor, memory, and a communication interface, cause the computing platform to:
generate, for a document, a security policy, wherein the security policy includes authorized recipients of the document and one or more response actions to execute upon determination of violation of the security policy;

embed, using steganography, the security policy in the document;

transmit the document, including the security policy embedded using steganography, from a source node to a destination node;

receive, from the destination node, a request to access the document;

responsive to receiving the request to access the document, execute the embedded security policy in the document to determine whether the security policy is violated;

responsive to determining that the security policy is not violated, enable access to the document by the destination node; and responsive to determining that the security policy is violated, execute the one or more response actions.

16. The one or more non-transitory computer-readable media of claim 15, wherein determining whether the security policy is violated includes determining whether the destination node is associated with an authorized recipient of the authorized recipients in the security policy.

17. The one or more non-transitory computer-readable media of claim 15, wherein the one or more response actions include one or more of: deleting the document and destroying contents of the document at the destination node.

18. The one or more non-transitory computer-readable media of claim 15, further including instructions that, when executed, cause the computing platform to:

segment the document into a plurality of content fragments; and encrypt each content fragment of the plurality of content fragments, and wherein transmitting the document from the source node to the destination node includes transmitting each encrypted content fragment in distinct content container.

19. The computing platform of claim 4, wherein the plurality of content fragments includes a number of content fragments determined based on whether the destination node is internal to an enterprise organization or external to the enterprise organization.

20. The computing platform of claim 1, wherein executing the one or more response actions includes:

identifying sensitive information within the document; and deleting only the sensitive information within the document.

* * * * *